US005714069A

United States Patent [19]
Sager

[11] Patent Number: 5,714,069
[45] Date of Patent: Feb. 3, 1998

[54] APPARATUS FOR REMOVING GREASE FROM WASTE WATER

[76] Inventor: Robert Sager, 507 NW. 11th St., Mineral Wells, Tex. 76067

[21] Appl. No.: 719,644

[22] Filed: Sep. 25, 1996

[51] Int. Cl.[6] ............................................. C02F 1/40
[52] U.S. Cl. .......................... 210/519; 210/521; 210/540
[58] Field of Search .............................. 210/519, 521, 210/532.1, 538, 540

[56] References Cited

U.S. PATENT DOCUMENTS

| 1,343,764 | 6/1920 | Clifford . | |
| 2,393,498 | 1/1946 | Miller | 210/538 |
| 2,440,762 | 5/1948 | Sitton | 210/538 |
| 2,624,463 | 1/1953 | Freese | 210/519 |
| 2,846,073 | 8/1958 | Hopper, Sr. | 210/540 |
| 2,874,850 | 2/1959 | Unthank . | |
| 3,529,728 | 9/1970 | Middlebeck et al. | 210/540 |
| 4,422,931 | 12/1983 | Wolde-Michael | 210/540 |
| 4,455,231 | 6/1984 | Filippi | 210/519 |
| 4,886,605 | 12/1989 | Merve | 210/519 |
| 4,915,823 | 4/1990 | Hall | 210/519 |
| 5,021,153 | 6/1991 | Haws | 210/521 |
| 5,204,000 | 4/1993 | Steadman et al. | 210/519 |
| 5,326,469 | 7/1994 | Thompson | 210/540 |
| 5,326,474 | 7/1994 | Adams et al. | 210/540 |
| 5,505,860 | 4/1996 | Sager | 210/519 |
| 5,543,064 | 8/1996 | Butten | 210/521 |

*Primary Examiner*—Christopher Upton

[57] ABSTRACT

An assembly for removal of grease from waste water is provided. The assembly has an inlet conduit which is connected to a modified J-trap. The J-trap has a perforated grease deflecting dispersion means in fluid receiving relation to the outlet end of the J-trap. The dispersion means serves to disperse the grease on the upper surface of the liquid contained within the housing of the assembly. A pair of vertically extending baffles serve to effectively block the flow of grease to the outlet. A first baffle is connected to the sidewalls of the assembly thereby substantially reducing the flow of grease containing waste water. A second baffle is secured to the bottom of the assembly and is proximate the outlet conduit. The dispersion means can be adjusted to control the flow rate of liquids passing through the assembly thus allowing the device to be used with a range of sink sizes.

4 Claims, 2 Drawing Sheets

APPARATUS FOR REMOVING GREASE FROM WASTE WATER

BACKGROUND OF THE INVENTION

1. Field of the Invention

The present invention relates to water treatment devices. More specifically, it relates to an improved sewage water treatment apparatus which removes grease and oil from sewage water.

2. Description of the Prior Art

As will be seen, the simplicity and effectiveness of my invention is not rivaled in the prior art.

U.S. Pat. No. 4,915,823 issued to Hall discloses an assembly for separating oil from water. The assembly has a first upright conduit which is connected to an inlet conduit at one end and has an oil dispersion means secured to the opposite end. Separate outlets are provided for the oil and the water and no baffles are employed. By contrast, the present invention discloses a grease separation apparatus having a single outlet for degreased water. The inlet conduit has a modified J-trap secured thereto. The J-trap has a dispersion hood secured to the outlet end. A baffle arrangement used in combination with the dispersion hood cooperate to prevent grease from flowing through the outlet conduit.

U.S. Pat. No. 5,021,153 issued to Haws discloses an apparatus for removing grease and grit from sewage. The apparatus has a least one moving part and requires a pressurized air supply line in order to operate discloses a locking device which is securable in the strike plate opening. By contrast, the present invention contemplates a passive grease removal apparatus which requires no moving parts.

U.S. Pat. No. 5,326,474 issued to Adams et al. discloses a fluid separator having an inlet conduit and a pair of outlet conduits. A single horizontal baffle is employed. By contrast, the device of the present invention has one inlet and one outlet conduit and employs a series of vertically extending baffles.

U.S. Pat. No. 2,874,850 issued to Unthank discloses an apparatus for separating oil and water. The device employs concentric inlet and outlet conduits and a baffle arrangement. By contrast, the device of the present invention has separate inlet and outlet conduits which are separated by a pair of baffles.

None of the above inventions and patents, taken either singly or in combination, is seen to describe the instant invention as claimed.

SUMMARY OF THE INVENTION

Briefly, the invention comprises an assembly for removal of grease from waste water. The assembly has an inlet conduit which is connected to a modified J-trap. The J-trap has a perforated grease deflecting dispersion means in fluid receiving relation to the outlet end of the J-trap. The dispersion means serves to disperse the grease on the upper surface of the liquid contained within the assembly. A series of vertically extending baffles serve to effectively block the flow of grease to the outlet. A first baffle is connected to the sidewalls of the assembly thereby substantially reducing the flow of grease containing waste water. A second baffle is secured to the bottom of the assembly and is proximate the outlet conduit. The dispersion means can be adjusted to control the flow rate of liquids passing through the assembly thus allowing the device to be used with a range of sink sizes.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
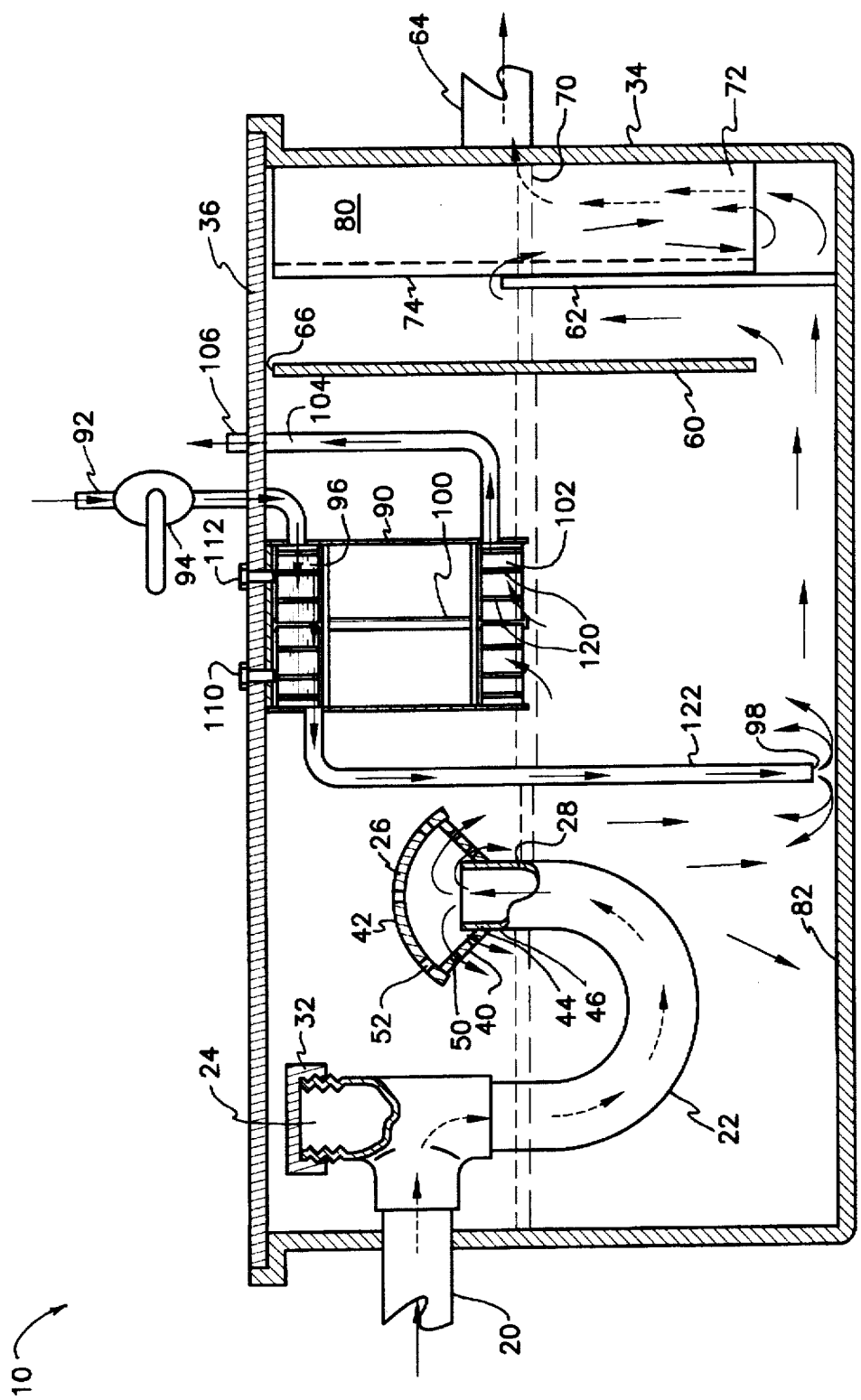
FIG. 1 is a sectional side view detailing the conduit and baffle arrangement of the present invention.
Figure 2:
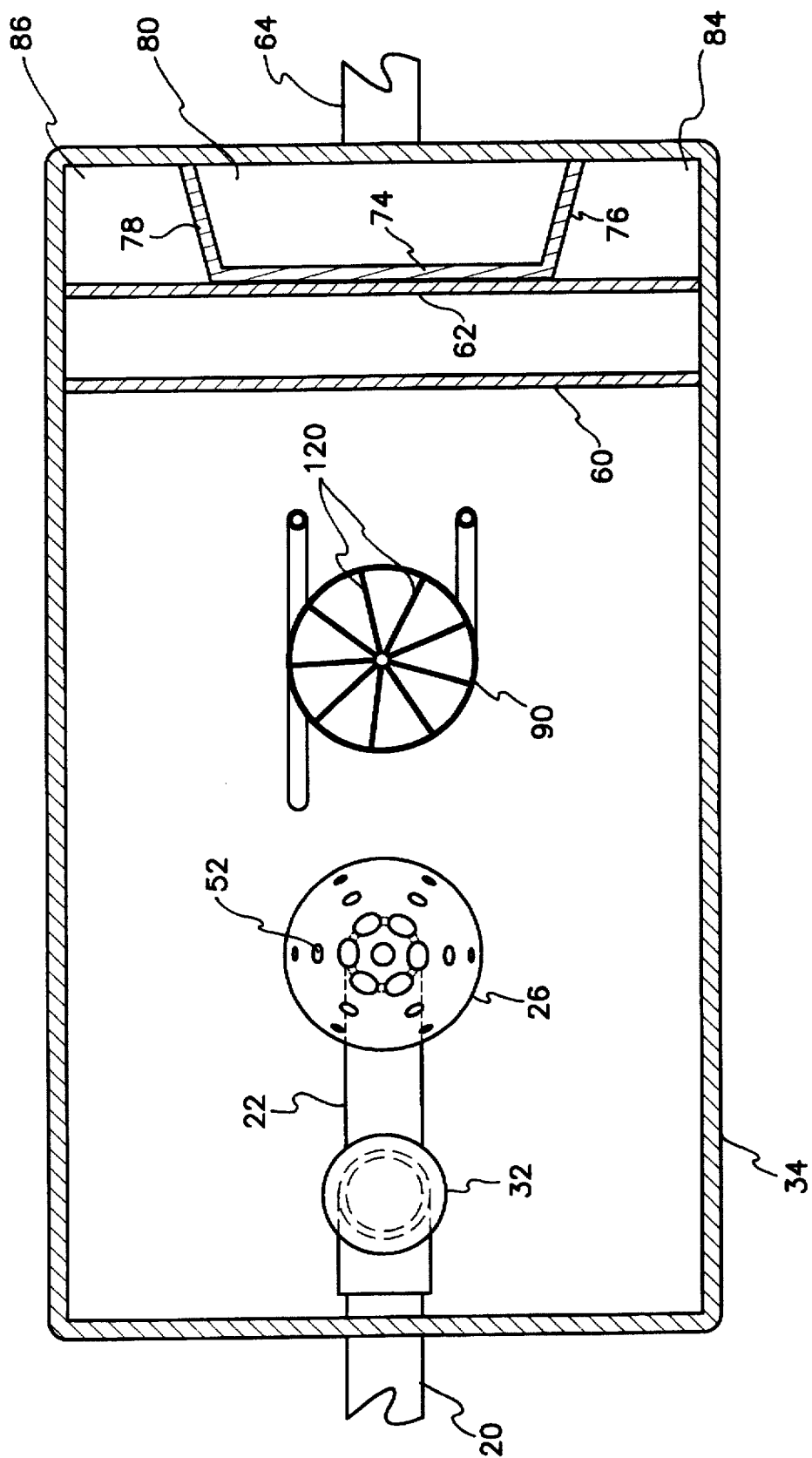
FIG. 2 is a top view of the arrangement of the present invention with the top cover removed.

Referring now to FIGS. 1 and 2, the assembly of the present invention, generally indicated by the numeral 10, has an input conduit 20 into which untreated water flows. The untreated water may be from a restaurant, food processing facility, or other source which may produce water which is high in grease, oil, or other lighter than water contaminants. The input conduit 20 is secured to a modified J-trap 22 which has an access opening 24 proximate the inlet conduit 20 and a dispersion means 26 secured to its outlet end 28.

The access opening 24 has a removable cover 32 secured thereto. The cover 32 may be threadably secured or secured by frictional fit. The access cover 24 may be removed in the event the J-trap 22 becomes clogged or for periodic maintenance. The housing 34 which contains the assembly of the present invention 10 is provided with a removable top 36 which can be removed to allow access to the access opening 24.

The dispersion means 26 has a flared bottom portion 40 and a domed top 42. The bottom portion 40 has internal threads 44 which allow for threaded engagement with external threads 46 at the outlet end 28 allowing for removal of the dispersion means to effect periodic maintenance and cleaning. Furthermore, the dispersion means 26 is adjustably positioned on the outlet end 28 of the J-trap 22 to allow for a variable flow rate as will be explained later.

Both the bottom portion 40 and the top 42 have a plurality of evenly spaced apertures 50, 52 formed therein. The apertures 50, 52 serve to substantially direct the water flowing from the outlet end 28 of the J-trap 22 radially outward along what may be referred to as a transversely oriented dispersion surface. Flow of the water from the outlet end 28 along the dispersion surface effectively transforms the water/grease mixture into a thin sheet which floats upon the rest of the water contained within the housing 34. Thus the water separated from the grease or oil will tend to collect in the lower portion of the housing 34.

A pair of baffles 60 and 62 cooperate to effectively prevent the flow of grease from the dispersion surface to the outlet conduit 64. The first baffle 60 is attached to the sidewalls of housing 34 and extends downwardly within the housing. An air space 66 is provided at the top of the baffle 60 to improve the air flow within the housing 34. The bottom of baffle 60 is placed far enough below the dispersion surface so that most of the water flowing thereunder will be substantially grease free.

The second baffle 62 is secured to the bottom of the housing 34 and extends upwardly to the static water line 70. An outlet baffle 72 is secured between baffle 62 and outlet conduit 64. The outlet baffle 72 has a rearwall 74 secured to the downstream side of baffle 62. A pair of side walls 76, 78 extends forwardly of the rear wall 74 thereby defining a partially enclosed outlet chamber 80. The side walls 76, 78 extend from the top of the interior of the housing 34 to a point near the bottom wall 82 of the housing 34 as is best seen in FIG. 2. The side walls 76, 78 form a pair of fluid receiving chambers 84, 86 on opposite sides of the outlet conduit 64 thereby directing fluid flow to either side of the outlet conduit 64. Preferably the sidewalls 76, 78 are formed at an angle to the rearwall 74 as shown in FIG. 2 to reduce turbulence in the fluid flowing over baffle 62. It can be readily appreciated that excessive turbulence will cause grease from the dispersion surface to become mixed in with the effluent water.

Of course, the entire housing 34 is fluid tight and capable of withstanding relatively high internal pressures. In the preferred embodiment the housing 34 is formed of a hardened plastic or other suitable rigid material as would be deemed expedient to one skilled in the art. The top 36 may be transparent to allow fluid flow within the housing to be visually monitored.

In order to improve grease/oil removal, a water driven pump 90 may be added to the assembly 10 of the present invention. The pump need not be gas tight or water tight and is not propelled by electricity or by fluid incompatible with the liquids it is designed to separate.

The pump 90 has an inlet conduit 92 having an integral shut-off valve 94. A water driven turbine 96 is in fluid receiving relation to the inlet conduit 92 so as to be driven by fluid flowing therethrough. The inlet conduit 92 extends past the turbine 96 and downwardly to an exit orifice 98 proximate the bottom wall 82 of the housing 34. The turbine 96 is connected by a draft shaft 100 to a second turbine 102 which is in fluid contact with the dispersion surface. A discharge conduit 104 extends upwardly and out of the housing 34 through the top 36 terminating in an discharge opening 106. The pump 90 is held in place by a pair of bolts 110, 112 which are secured through apertures formed in the top 36.

In operation, the inlet conduit of the assembly 10 is secured to a waste water conduit (not shown) via a suitable fluid tight coupling. Waste water enters the conduit via inlet 20 where it flows into and through the J-trap 22 exiting through the dispersion means 26. Most of the grease or oil flows out of the dispersion means 26 and onto the dispersion surface. The rest of the waste water collects beneath the dispersion surface and flows downstream to the first baffle 60. It can be readily appreciated that the water flowing underneath the baffle 60 will have a much lower grease/oil content than water at the dispersion surface. Waste water then flows upwardly and over the second baffle 62 and then downwardly on either side of the sidewalls 76, 78. Water then exits the chamber 80 before exiting the assembly via outlet conduit 64.

Adjustable control over the flow rate of the waste water is effected by adjusting the position of the dispersion means 26. The dispersion means 26 may be turned and thereby raised or lowered via threads 44. Raising and lowering the dispersion means 26 in this manner effectively controls the flow rate by selectively blocking fluid flow through some of the apertures 50, 52. Of course, any suitable means for raising/lowering the dispersion means as would be expedient to one skilled in the art may be employed.

If desired, pump 90 may be employed to effect removal of grease from the dispersion surface. A source of water, preferably hot, is applied to the inlet conduit 92. Valve 94 may be used to control the flow rate of the water applied to the inlet conduit 92. The water applied to the inlet conduit 92 causes turning of the first turbine 96 which in turn rotates the second turbine 102 which has a plurality of blades 120 which force grease and water from the dispersion surface and into and through the discharge conduit 104. Water applied to the inlet conduit 92 exits from the outlet end 122 proximate the bottom 82 of the housing 34 where it mixes in with the partially separated waste water thereby effectively reducing the grease content per volume thereof. Since both turbines 96, 102 are turning at the same speed, water applied to the inlet conduit 92 of the pump assembly 90 will not cause filling of the housing 34.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A grease trap assembly for separating grease or other lighter than water contaminants from waste water comprising:

a housing, said housing having top and bottom walls, a pair of opposing sidewalls, an upstream wall and a downstream wall thereby forming an enclosure having an inlet conduit and an outlet conduit;

said inlet conduit extending through said upstream wall and connected in fluid receiving relation with a J-trap having a discharge end;

dispersion means mounted in fluid receiving relation to said discharge end of said J-trap, said dispersion means having a plurality of evenly spaced apertures formed therein and configured to disperse fluid exiting therefrom in a substantially radial path of flow relative thereto;

a first baffle downstream of said dispersion means and connected to the sidewall of the housing spaced from the bottom of the housing, a second baffle downstream of said first baffle and connected to the bottom of the housing, and a third baffle connected to said second baffle, said third baffle having a pair of sidewalls connected between said second baffle and said downstream wall spaced from the bottom of the housing thereby forming an exit chamber, said outlet conduit extending through said downstream wall and in fluid receiving relation with said exit chamber.

2. The assembly of claim 1 further including a water driven pump for removing grease from said dispersion surface.

3. The assembly of claim 1 wherein said dispersion means comprises adjustment means to control the flow rate of waste water entering the enclosure.

4. The assembly of claim 1 wherein said placement of said first baffle, said second baffle and said third baffle and the placement of said inlet conduit and said outlet conduit above a static water line from means to prevent siphoning.

* * * * *